Aug. 12, 1941.                H. SMALLMAN                 2,252,649
                               SELF-INKER
                     Filed Sept. 5, 1940         2 Sheets-Sheet 1
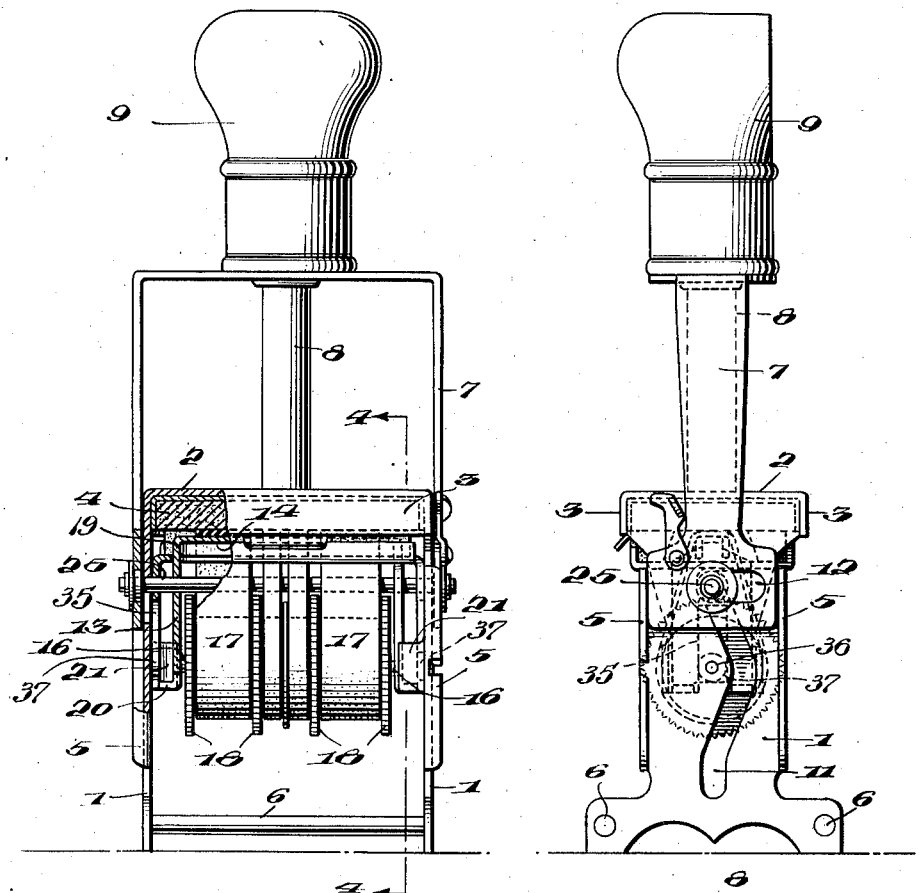
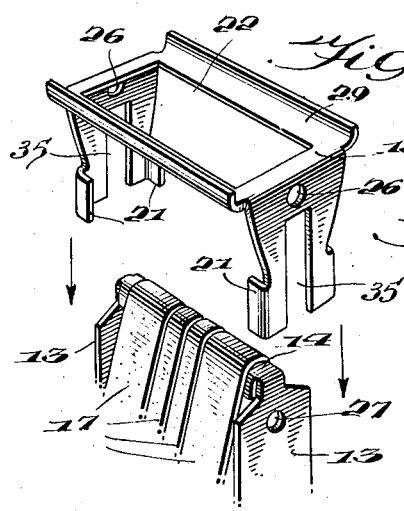
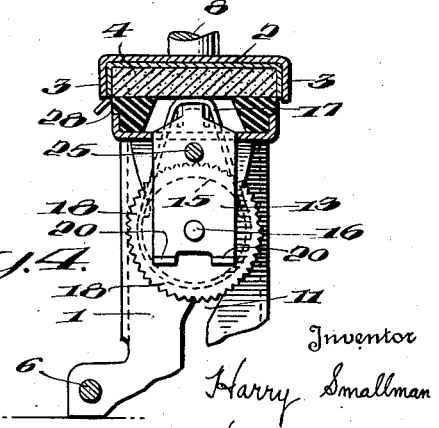
Inventor
Harry Smallman
By Vernon E. Hodges
H. Hamlin Hodges   his Attorneys

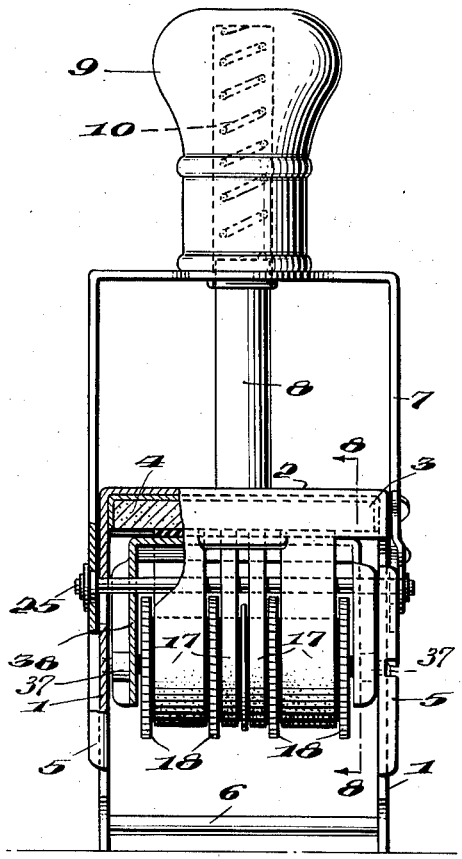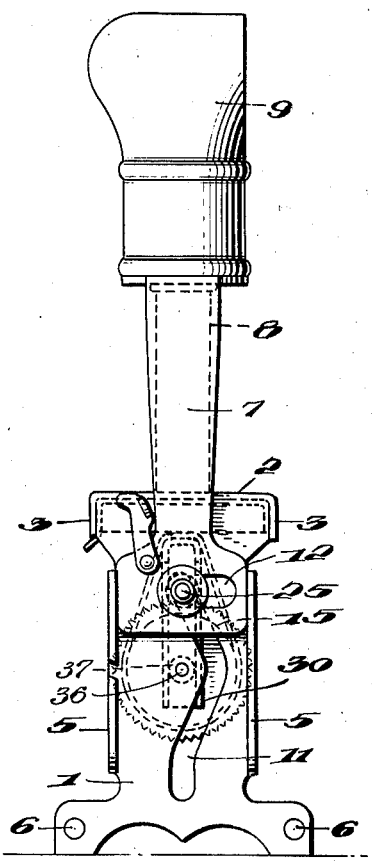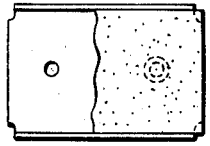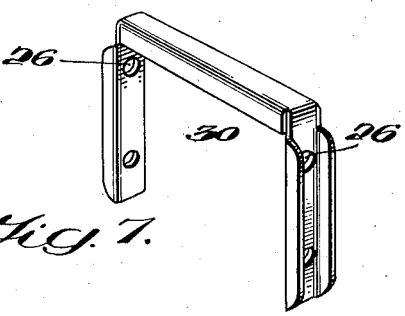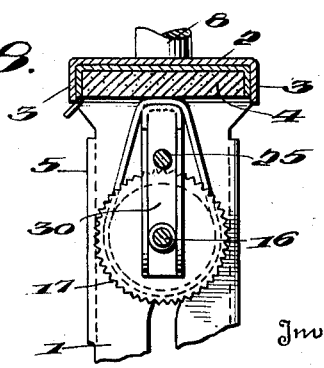

Patented Aug. 12, 1941

2,252,649

UNITED STATES PATENT OFFICE 2,252,649

SELF-INKER

Harry Smallman, Philadelphia, Pa., assignor to Hill-Independent Manufacturing Company, Germantown, Philadelphia, Pa., a corporation of Pennsylvania Application September 5, 1940, Serial No. 355,513

7 Claims. (Cl. 101—333)

This invention relates to an improvement in self-inkers.

The invention consists primarily in a frame, a spring-actuated yoke, an assembly unit having pivotal sliding connection with the frame, pivoting means projecting from the frame, with which the unit has pivotal sliding connection and means connected with the yoke and unit and extending through guide or cam slots in the sides of the frame and yoke for turning the unit alternately into the self-inking and the line-dating positions.

As will be hereinafter pointed out by slight modifications, the inker is capable of several adaptations and uses for different purposes.

In the accompanying drawings:

Fig. 1 is a view in rear elevation of one form of the invention with a portion broken out and in section;

Fig. 2 is a view in end elevation;

Fig. 3 is a view in perspective of one form of die-plate and a portion of the attachment assembly or unit, the two being disconnected but in position to be assembled;

Fig. 4 is a section on line 4—4 of Fig. 1, looking in the direction of the arrows;

Fig. 5 is a view in rear elevation similar to Fig. 1, but showing a modification for a slightly different adaptation;

Fig. 6 is an end view of the same;

Fig. 7 is a view in perspective of a bridge employed in this form of self-inker omitting the die-plate shown in Fig. 3;

Fig. 8 is a fragmentary cross-section on line 8—8 of Fig. 5, looking in the direction of the arrows; and Fig. 9 shows a modified form of die-plate.

The self-inker consists generally of four main parts, namely a main frame having channeled sides, a yoke guided thereby and having sliding connection therewith, a die-plate, and a line dater attachment capable of being easily assembled and disassembled, as a separate unit.

These several elements are preferably each stamped out of sheet-metal, although obviously not necessarily.

The main frame consists of two sides 1 and a connecting top-plate 2, the opposite edges of which latter are turned down in the form of flanges 3, providing a recess for the inking pad 4, which is removably housed therein beneath the top plate.

The opposite edges of the sides 1 terminate in outturned guide flanges 5, and the lower ends of the sides are spaced apart and connected by rods 6, in the usual manner.

The yoke 7 spans the main frame and its ends are slidably connected with the sides of the main frame and are guided in their up and down movements by and between the outturned flanges 5. A stem 8 is rigidly secured to the center of the top plate 2, and extends upwardly through a hole therefor in the center of the yoke and into the handle 9, secured on the top plate 2, with which handle the stem has sliding connection; and a spring 10 within an orifice in the handle presses upon the handle and the stem for normally holding the parts in the position shown in Figs. 1, 2, 4, 5, 6 and 8. Thus, the outturned flanges 5 and the stem 8 cooperate to confine the movements of the yoke in the operation of the self-inker to a straight rectilinear movement, and, incidentally, the flanges 5 serve as strengthening ribs for the sides 1 of the main frame.

The sides 1 are provided with correspondingly shaped curved slots 11, which extend throughout the major portion of the length of the sides, and the lower ends of the yoke are each provided with a transverse slot 12 (as shown in Figs. 2 and 6) the special function of which slots will be hereinafter explained.

The line dater or numberer forms a unit by itself, and consists of end plates 13, cross-bar 14 having flanged edges to give it strength, the usual serrated drums 15 which are mounted to turn on the spindle 16, and the usual rubber bands 17 with toothed wheels 18 for individually adjusting the bands in the usual manner.

This unit or assembly is removably mounted in the die-plate 19 shown in Fig. 3, wherein it is confined and held properly spaced by outturned lugs 20 on the end plates 13, and the lugs 21 on the die-plate.

The die-plate 19 is provided at the center, with a slot 22, through which the unit extends, the end plates 13 preferably just fitting the ends of this slot 22, the characters in use and to engage the inking pad protruding sufficiently through this slot 22 to properly contact the inking pad 4.

Open slots 35 are formed in the ends of the die-plate 19 and in these fixed studs 36 extend from the sides 1 of the main frame, acting as a fulcrum on which the die-plate slides and turns, with the tumbling movement of the unit. To facilitate this action and reduce friction, anti-friction rollers 37 may be mounted on the ends of the studs in the slots.

A pin 25 extends through the slots 11 and 12 in the sides 1 of the main frame and in the lower ends of the yoke 7, respectively, and thence through holes 26 and 27 in the ends of the die-plate and the unit, respectively (see Fig. 3), so that with each complete movement of the yoke the unit is given a half turn; in other words, the upward movement of the yoke, due to the action of the spring 10 always returns the characters over the bar 14 for re-inking, and when the handle is depressed, the downward movement of the yoke imparts a half revolution to the unit and brings the self-inker against the object to be stamped. Upon the removal of the pressure of the hand, the parts return to their normal position as indicated in Figs. 1, 2, 4, 5, 6 and 8.

The usual rubber pads 28, are held in the channels 29 on either side of the slot 22.

From the foregoing, it will be seen that the inking attachment is in the form of a separate unit assembled before placing it in the self-inker, thus providing for a much quicker and more uniform assembly than heretofore. Another advantage is that this separate assembly unit is so constructed that it can be entirely lifted out of the device, and be renewed or replaced by removing the pin 25.

Hitherto it has been mentioned that this invention is capable of slight variations and adaptations according to the requirements, and in Figs. 5 to 8 a construction is shown in which the die-plate viewed in Fig. 3 is entirely eliminated, and in its place is substituted a bridge 30, which more or less corresponds to the part illustrated in Fig. 3, that is to say in function; and it consists in an intermediate cross-bar over which the printing part of the bands is drawn, and two sides, all of which are flanged at their edges for greater strength. When thus constituted, the device is a self-inker pure and simple, set up as a line dater or numberer. The flanged ends of bridge 30 receive the studs 36 and rollers 37 as the fulcrum on which the bridge turns and slides in the operation of the device.

When used as a plain self-inker and not a dater, the die-plate may be made in the form illustrated in Fig. 9, which substantially corresponds with the die-plate shown in Fig. 3, with the omission of the slot 22, which was a clearance space in the construction viewed in Fig. 3, through which the printing surface protruded. With the construction shown in Fig. 9, there is provided what is commonly known is a plain self-inker.

I claim:

1. A hand-stamp including a frame having a top plate and channeled and slotted sides, a yoke embracing and fitted to slide in the channeled sides, and having a transversely disposed slot in each end, a unit including a die-plate and dater or numberer, a pin extending through the slots in the sides and in the yoke and through the unit, and studs projecting from the sides of the frame and with which the die-plate has sliding pivotal contact, the studs acting as a fulcrum for causing the unit to turn into its desired position with the upward and downward movement of the yoke.

2. A hand-stamp including a frame having a top plate and channeled and slotted sides, a yoke embracing and fitted to slide in the channeled sides, and having a transversely disposed slot in each end, a unit including a slotted die-plate and adjustable indicia, a pin extending through the several slots in the frame and yoke and through the unit, studs projecting from the sides of the frame and with which the die-plate has sliding pivotal contact, the studs acting as a fulcrum, and spring means for moving the unit in one direction.

3. A hand-stamp including a frame having a top plate and channeled and slotted sides, a yoke embracing and fitted to slide in the channeled sides, and having a transversely disposed slot in each end, a unit including a die-plate and adjustable data, a pin extending through the several slots in the frame and yoke and through the die-plate, means projecting from the sides of the frame and with which the die-plate has sliding pivotal contact, said means acting as a fulcrum, spring means for moving the unit in one direction, the slots in the channeled sides extending substantially throughout the major portion of the length of the sides and deflected transversely between their ends, whereby to guide the pin in its movements in the slots in the sides of the frame, in turning the unit from one extreme position to the other.

4. A hand-stamp including a frame having a top plate and channeled and slotted sides, a yoke embracing and fitted to slide in the channeled sides, and having a transversely disposed slot in each end, a unit including a die-plate, a frame, cross-bar, sides, drums and bands carrying characters extending over the cross-bar and drums, and means projecting from the sides of the frame and with which the die-plate has sliding pivotal contact, said means acting as a fulcrum, and a pin extending through the unit and the slots for turning the unit from one extreme position to the other with the movements of the yoke.

5. A hand-stamp including a frame having a top plate and channeled and slotted sides, a yoke embracing and fitted to slide in the channeled sides, and having a transversely disposed slot in each end, a unit including side-plates, cross-bar, a slotted die-plate, studs projecting from the sides of the frame into the slots of the die-plate, and a pin extending through the unit and the slots of the frame and yoke, the studs acting as an axis upon which the unit turns, the outer ends of the pin extending through the slots in the sides of the frame and in the yoke.

6. A self-inker including a frame having channeled sides with arcuate slots in the sides, a yoke embracing and fitted to the channeled sides, the yoke having transverse slots in each end, studs extending inwardly from the sides of the frame, a unit having sliding pivotal connection with the studs, which latter act as a fulcrum therefor, and a pin extending through the unit and the slots in the sides of the frame and ends of the yoke.

7. A self-inker including a frame having channeled sides with arcuate slots in the sides, a yoke embracing and fitted to the channeled sides, the yoke having transverse slots in each end, studs extending inwardly from the sides of the frame, a unit having sliding pivotal connection with the studs, which latter act as a fulcrum therefor, a pin extending through the unit and the slots in the sides of the frame and ends of the yoke, a stem extending from the frame, the yoke having sliding connection with the stem and sides of the frame, and a spring for moving the yoke in one direction, whereby to reverse the position of the unit and return it to normal position.

HARRY SMALLMAN.